Nov. 1, 1949      T. C. NORMANN      2,486,671

POWER TRANSMISSION MEANS

Filed July 30, 1946

INVENTOR
THORVALD C. NORMANN
BY Young, Emery & Thompson
ATTYS-

Patented Nov. 1, 1949

2,486,671

UNITED STATES PATENT OFFICE 2,486,671

POWER TRANSMISSION MEANS

Thorvald Cato Normann, Oslo, Norway

Application July 30, 1946, Serial No. 687,071
In Norway June 22, 1946

1 Claim. (Cl. 74—417)

One object of this invention is to provide a new novel transmission gear for transmitting power from the motor to the propeller shaft in aeroplanes. According to the invention this is done in such a way that the motor or motors may be located in the fuselage of the aeroplane with the axial direction pointing rather towards the tip of the wings or pointing in the direction of the fuselage, while the propeller or propellers are mounted in the wings with their axis substantially normal to the longitudinal axis of the wings. The transmitting thus taking place in angular relation from the axis of the motor or motors to the axis of the propeller or propellers.

Another object of this invention is to provide means for transmitting the power from the drive shaft to the driven shaft in angular relation different from 90° and in such a way that highest possible evenness will be obtained, when transmitting the power from the one shaft to the other and that undue stresses due to torque will be avoided.

According to the invention this is done in a way that the shaft of low speed is provided with a holder for two annular racks concentrically arranged with reference to the axis of the low speed shaft and arranged with their teeth pointing in opposite directions away from each other. The high speed shaft being introduced in angular relation through an annular hole in the racks and being provided with pinions corresponding respectively each with one of the racks at diagonally opposite places.

A further object of this invention is to provide means whereby added security is introduced in relation to the possibility of the breakage of the high speed shaft. This is according to the invention done in a way that each one of the said pinions is carried on individual shafts one introduced into the other, that is the shortest one of the shafts is constructed as a hollow tube and the longest one is mounted in the hollow of the said tube.

In order that this invention shall be easily understood and worked, it will in the following be described with reference to the drawing, illustrating some preferred embodiments of the invention.

Figure 1:
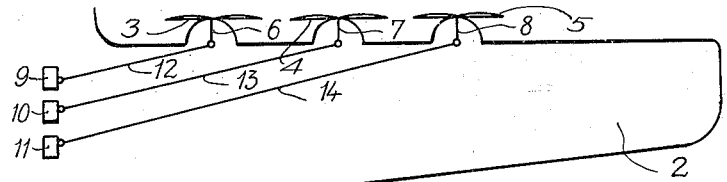
Fig. 1 illustrates schematically the lay out of the driving gears for aeroplanes showing one wing of the plane and one side of the fuselage.

In Fig. 1 1 is the fuselage of the aeroplane, 2 is the right hand wing of the same. In the front edge of the wing a number of propellers 3, 4 and 5 are mounted with their axles 6, 7 and 8 pointing in the direction normal to the axis of the wing 2. A number of power units or motors 9, 10 and 11 are mounted in the fuselage easily controllable for the engineer, who has as his responsibility to maintain the safe running of the motors. Between the motors 9, 10 and 11 and the corresponding driven shafts 6, 7 and 8 for the propellers there are arranged drive shafts 12, 13 and 14 in angular relation to the shafts 6, 7 and 8, which angle is different from 90°. For transmitting the driving power from the shafts 12, 13 and 14 to the shafts 6, 7 and 8 certain special arrangements have been done according to the invention by providing a transmission, which is shown in Fig. 2.

Figure 2:
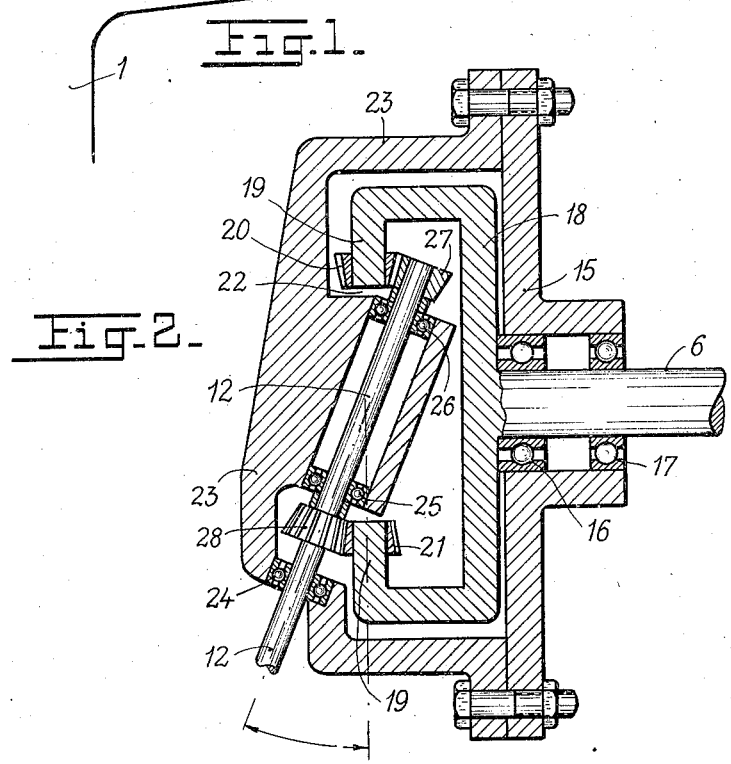
Fig. 2 illustrates in cross section the main parts, which enter into the means for transmitting the power in angular direction from one shaft to the other.

In Fig. 2 6 denotes the shaft of low speed. This is mounted in a stationary frame 15 on ball bearings 16 and 17. The shaft 6 is provided with a cup-shaped ring member 18 having the shape of an open cylinder with overhanging edges 19. On both sides of the overhanging edges 19 annular racks 20 and 21 are mounted concentrically in relation to the shaft 6. A high speed shaft 12 is arranged in such a way that it enters through the annular hole 22 in the racks 20 and 21 and is mounted in a holding member 23 rigidly attached to the frame 15. Ball bearings 24, 25 and 26 are arranged to support the shaft 12. At the end of the shaft 12 a pinion 27 is fixed to the shaft and is arranged in mesh with the annular rack 21. At a suitable position to be in mesh with the annular rack 20 another pinion 28 is fixed to the shaft 12.

Figure 3:
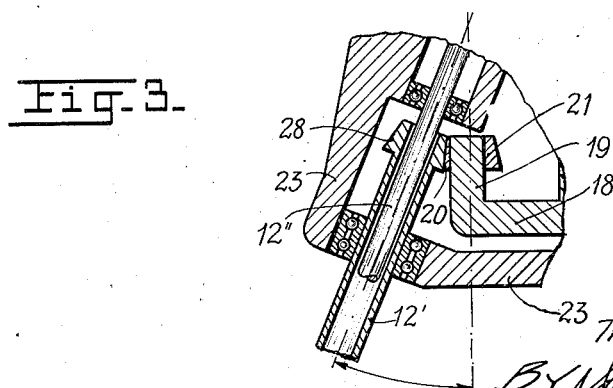
Fig. 3 illustrates a small part of the transmission shown in Fig. 2 and indicates a modification of the construction.

The mechanical function of the construction above described will be evident to anybody skilled in the art and the advantages with these arrangements will also be obvious. If it is taken that the shaft 12 is the driver shaft running at high speed, the torque from this shaft simultaneously will be transmitted at diagonal position and points on the holding member 18, whereby uneven torque stresses will be avoided in the said holding member 18 and a very even running or driving of the shaft will be provided. At the same time the torque exerted on the shaft 12 between the two pinions 27 and 28 will be neutralised by the driving on both sides of the said shafts. As a matter of security to avoid breakdown the shaft 12 may, however, as illustrated in Fig. 3 be divided into two separate shafts, whereby the shaft 12' is constructed hollow and is provided with the pinion 28 in mesh with the rack 20, while the other shaft 12" is mounted inside the shaft 12', whereby the driving of the shaft 6 will continue even if one of the shafts 12' or 12" should break.

I claim:

A device for transmitting power from a drive shaft to a driven shaft in angular relation to each other comprising a frame with a holding member secured together and provided with two center bearings and one outer bearing for the drive shaft, a bearing in the frame for the driven shaft, a ring member secured to the driven shaft and provided with a pair of annular gear racks concentrically mounted on the ring member, and a pair of pinions on the driving shaft mounted in spaced relation thereon and each meshing with its respective gear rack, said holding member supporting the pair of center bearings for the drive shaft intermediate the pinions.

THORVALD CATO NORMANN.

REFERENCES CITED

The following references are of record in the file of this patent:

UNITED STATES PATENTS

| Number | Name | Date |
|---|---|---|
| 80,164 | Groff | July 21, 1868 |
| 797,101 | Dingee | Aug. 15, 1905 |
| 1,226,455 | Braden | May 15, 1917 |
| 1,881,923 | Powell | Oct. 11, 1932 |

FOREIGN PATENTS

| Number | Country | Date |
|---|---|---|
| 340,983 | Germany | Sept. 22, 1921 |
| 23,779 | Great Britain | Oct. 27, 1911 |